March 25, 1941.    G. C. MEYER ET AL    2,235,964
MOLD FOR ICE CREAM OR THE LIKE
Filed March 28, 1938    2 Sheets-Sheet 1

INVENTORS.
GUS C. MEYER and
PAUL L. COX
BY
ATTORNEY.

March 25, 1941.　　G. C. MEYER ET AL　　2,235,964
MOLD FOR ICE CREAM OR THE LIKE
Filed March 28, 1938　　2 Sheets-Sheet 2

INVENTORS
GUS C. MEYER and
PAUL L. COX
BY
ATTORNEY.

Patented Mar. 25, 1941

2,235,964

UNITED STATES PATENT OFFICE 2,235,964

MOLD FOR ICE CREAM OR THE LIKE

Gus C. Meyer and Paul L. Cox, Denver, Colo.

Application March 28, 1938, Serial No. 198,461

13 Claims. (Cl. 107—19)

This invention relates to an improved mold for ice cream or the like.

It is well known to those familiar with the art that there is a demand for fancy ice cream and other confections, bearing special designs appropriate for certain occasions such as national holidays, birthdays, card parties and the like.

Heretofore, one method of preparing ice cream having a special design or emblem has been to first mold and freeze the design in a continuous section, then remove this from the mold by warming the mold to release the ice, then sometimes placing the frozen design within a body of unfrozen material of a contrasting color, and finally freezing the entire mass into a homogeneous brick or the like. Some of the difficulties that have been encountered in such a method are that the molds are expensive and require considerable time and labor to manipulate. Furthermore, when the design ice is removed from its mold as by heating the mold, the sharpness of the design is sometimes lost due to the melting of the exterior surfaces of the design. When ice cream is made according to the above method a manufacturer must start well in advance of a given occasion and prepare and store quantities of such ice cream, because the method of producing it is slow and the demand comes suddenly and must be supplied from reserve stocks.

According to the present invention a simplified mold is provided that is intended to be used only once and then discarded. The present mold is preferably made of waterproof paper or thin cardboard, or it may be made of thin foil-like metal or other material. The embodiment herewith illustrated discloses molds that are primarily intended for individual servings; however, it will be understood that the present invention could be embodied in larger molds of any desired size to serve any number of people. The shape of these improved molds, while illustrated as downwardly tapering cylinders, obviously could be of any desired form such as rectangular, cylindrical, oval or the like.

While the mold of the present invention is intended primarily for use in the preparation of frozen desserts it could, of course, be used in molding gelatines, puddings and other desserts and confections.

A principal object of the present invention is to provide an inexpensive mold for ice cream or the like that provides means for incorporating a design on the material molded.

Another object is to provide a mold of this character from which the finished product is not removed until ready to serve, thus eliminating handling and maintaining strictly sealed sanitary conditions.

A further object is to provide a mold of the above character that can be quickly and easily removed from the material contained therein, when ready to use.

A still further object is to provide a mold for fancy ice cream and the like that may be adapted to produce a wide variety of designs in the same or in contrasting colors.

Other objects and advantages reside in specific details of design and construction which will be more fully disclosed in the following description and in the drawings wherein.

Figure 1:
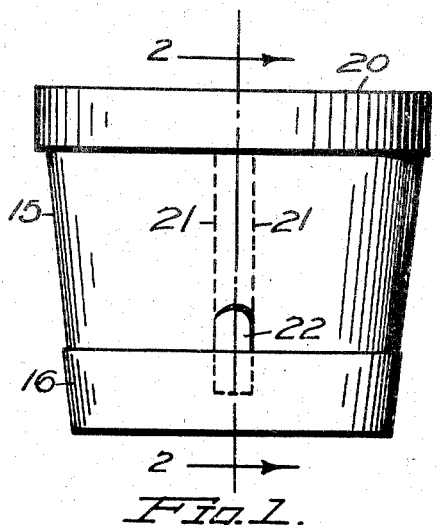
Figure 1 is a front elevation of an individual mold built according to this invention.
Figure 2:
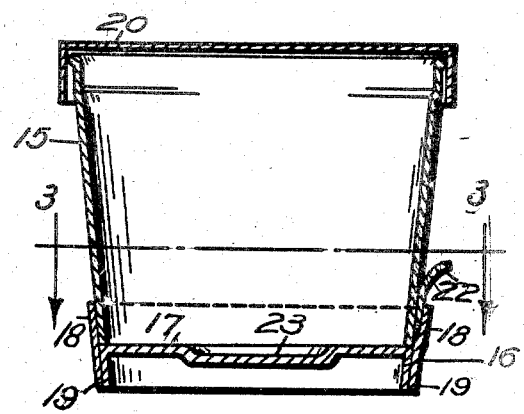
Figure 2 is a vertical section along line 2—2 of Figure 1.

In the drawings reference character 15 denotes a tapered cylindrical container preferably made of waterproof paper, thin cardboard, or thin metal such as tinfoil. At 16 is shown a closely fitting removable bottom closure that has a bottom partition 17, an upward flange 18 and a downward supporting flange 19. In the forms illustrated the flange 18 is telescoped over the container 15. A flanged cap or cover 20 provides a telescoping upper closure for the container. Along a side of the cylindrical portion 15 are double perforated or weakened lines 21, and folded between the part 15 and the flange 18 of the bottom closure is a tab 22 that extends above and outwardly of the flange 18 and is connected with the material between the weakened lines 21.

The bottom 17 has a depressed design 23 which in the instant illustration is in the form of a bell.

In use, material such as frozen or semi-frozen ice cream or the like of any color may be placed in the depression 23 filling it flush to the surface 17. Next, material such as frozen or semi-frozen ice cream or the like of a contrasting color may be placed in the mold to fill it substantially to its top, whereupon the cover 20 is placed in the position illustrated to complete the closure, and the container may then be refrigerated for completion of the freezing process to thoroughly unite the two colors of ice cream, and it may be stored or shipped under refrigerated conditions for use when needed.

A container of this character is not to be opened until its contents are ready to be served, whereupon the cover 20 may be removed, the mold inverted on a flat surface such as a dessert plate, the tab 22 pulled outwardly which removes the closure 16, and finally, a continuation of the pull on the tab will tear the body of the container along the weakened lines 21, thus completely removing all parts of the mold.

This procedure provides a nicely shaped serving of ice cream or the like with the design 23 in the same or in a contrasting color and raised in base relief from the body of the confection. Primarily a mold of this type is intended to produce an individual serving, but as above pointed out, such a mold may be made of a size to produce a body of ice cream or the like for any occasion, decorated in any desired appropriate manner that may be cut into individual portions, after the design has been appreciated by the guests.

Figure 4:
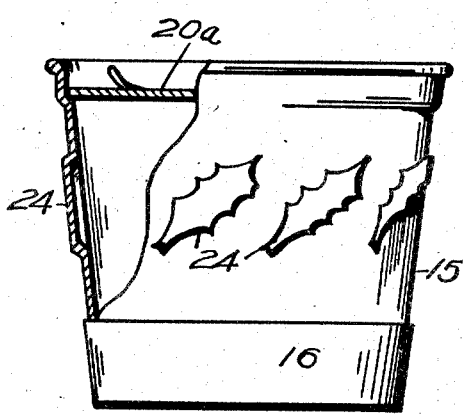
Figure 4 is an elevation partly in section of a modified form of the present invention.
Figure 3:
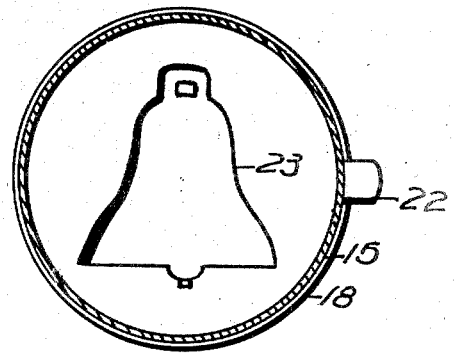
Figure 3 is a transverse section along line 3—3 of Figure 2.

Figure 4 illustrates a form of the invention wherein a holly leaf design 24 is impressed outwardly in the cylindrical wall of the container 15. The design in the bottom closure 17 may be used in combination with a design on the cylindrical wall, or either may be omitted. When a design such as shown at 24 is used the internal impressions may be filled with material of a color to contrast with the main body of ice cream or the like, or the entire mold may be made of one color, reproducing the design in base relief.

Figure 5:
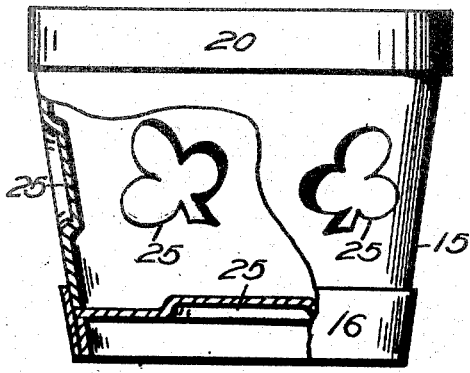
Figure 5 is an elevation partly in section of another modified form of the invention.

In Figure 5 a shamrock design 25 is illustrated as impressed inwardly in walls of the container. The mold in this form reproduces the design sunken into the finished product.

Figure 6:
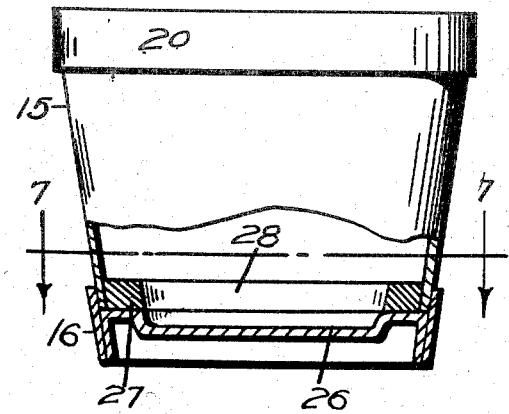
Figure 6 is an elevation partly in section illustrating another form of the invention.
Figure 7:
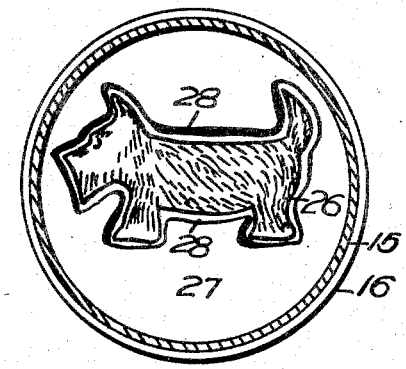
Figure 7 is a transverse section on line 7—7 of Figure 6.

Figures 6 and 7 illustrate a form of the invention wherein the bottom closure element 16 has an outwardly impressed design 26 which for purposes of illustration is shown in the form of a dog, and the surface texture of the impression is roughened to reproduce the effect of hair on the dog. A separate insert 27 is adapted to fit in the mold and has a cut-out portion 28 that corresponds to the size and shape of the impression 26. The insert 27 and the impression 26 give added depth to the design so that it stands up considerably higher and more prominently than it would if the insert 27 were omitted. It will be noted that the inner surfaces of the cut-out design in the insert 27 are tapered to facilitate the removal of the insert from the finished product, or in other words to give it "draft."

Figure 8:
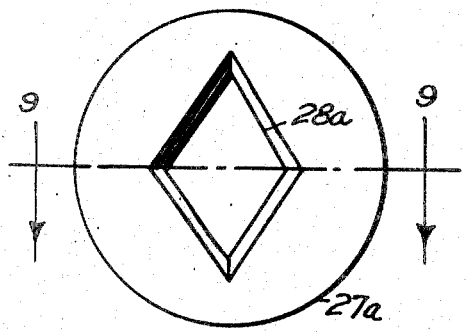
Figure 8 is a plan view of a mold part that is well adapted to be used with the form of the invention illustrated in Figure 6.
Figure 9:
Figure 9 is a cross section on line 9—9 of Figure 8.

Figures 8 and 9 illustrate a modified form of an insert similar to 27 but of greater thickness to produce a still higher design on the finished product. The design illustrated in Figures 8 and 9 is a diamond, which for instance, might be molded in red contrasted with a body of white ice cream, to be served at a card party or the like. Obviously, the other card suits could be similarly reproduced, and in fact almost any suitable design to simulate any occasion, or the insignia of any organization or convention may be reproduced in any of the forms of the mold herein illustrated. The insert 27 can be used in combination with either inward or outward impressions, or the insert may be used alone to form the design without the cooperation of any other impression in the mold.

A feature of the present invention is that ice cream or the like can be placed therein very rapidly and efficiently, whereupon the container is completely closed either by a telescoping cap as shown at 20 or a friction-fitting disk as at 20a. Thus the ice cream will not be contaminated and need not be opened until immediately before serving.

These improved molds are well adapted for use by either large or small producers of ice cream or other confectionery but they are particularly advantageous for the small user who cannot afford more expensive metallic permanent molds such as have been extensively used in the past. Obviously, since the present molds are intended for use only once, the problem of cleaning ice cream molds after they have been used and maintaining them sanitary and sterile is completely eliminated. It has been found that the quality of ice cream and the attractiveness of the design formed in the molds of the present invention are improved over the former product.

Molds made according to this disclosure may be easily handled, shipped and stored without danger of breakage, and the tapered cylindrical design herein illustrated is particularly well suited to handling and shipping. In the form of the invention wherein the design is a separable part of the mold assembly, obviously any desired design may be quickly adapted to the mold. The molds may be purchased as needed, and no other special equipment is necessary to produce an extremely wide variety of ice cream novelties or the like.

The design in the separate insert 27 need not always correspond in size and shape with the impressed design in the wall, but the two designs may cooperate to supply component elements. Thus a plurality of contrasting colors may be effectively used.

What we claim and desire to secure by Letters Patent is:

1. The combination with a container for ice cream or the like, of an insert therein having a design impression.

2. The combination with a container for ice cream or the like, of an insert therein having a mold design cut therethrough.

3. The combination with a container for ice cream or the like, of an insert therein having a tapered mold design cut therethrough.

4. A mold of the character described comprising a container having a design impression therein, and an insert in the mold having a design adapted to cooperate with the first said design.

5. A mold of the character described comprising a container having a design impression therein, and an insert in the mold having a design cut therethrough corresponding to the first said design.

6. A mold of the character described comprising a container having a design impression therein, and an insert in the mold having a design cut therethrough superposed on the first said design.

7. An ice cream mold comprising a tapered container inclusive of a bottom closure, and an element having a design, separably supported on said closure.

8. An ice cream mold comprising a tapered container inclusive of a bottom closure, and an element having a design cut therethrough, separably supported on said closure.

9. An ice cream mold comprising a container, a plurality of interchangeable inserts therefor, each having a different design, and means in the container for supporting the respective inserts.

10. An ice cream mold comprising a container inclusive of a bottom closure, and an element having a design for shaping the contents of the mold, separably supported on said closure.

11. An ice cream mold comprising a container inclusive of a bottom closure, and an element having a design cut therethrough for shaping the contents of the mold, separably supported on said closure.

12. An ice cream mold comprising a container composed of readily-destructible material for the reception of frozen matter, and an insert in the mold having a design impression therein.

13. An ice cream mold comprising a container composed of readily-destructible material for the reception of frozen matter and having a bottom closure, and an element having a design for shaping the contents of the mold, separably supported on said closure.

GUS C. MEYER.
PAUL L. COX.